Aug. 16, 1927.

I. R. AFONIN 1,639,625

OIL STORAGE TANK

Filed April 25, 1927

Inventor
Ivan R. Afonin
By
Attorney

Patented Aug. 16, 1927.

1,639,625

UNITED STATES PATENT OFFICE.

IVAN RODIONOVITCH AFONIN, OF BAKU, CAUCASUS.

OIL-STORAGE TANK.

Application filed April 25, 1927, Serial No. 186,528, and in Russia February 7, 1926.

The most efficient means used at present for preventing the evaporation losses in oil storage tanks and for preserving the gases resulting from such evaporation, consist in
1. Riveted steel roofs with water seals and the use of special gas receivers to hold the evaporated gases.
2. Floating steel roofs of rigid construction, covering the whole sectional area of the tank.

Either of these methods requires heavy, complicated and therefore expensive construction.

As regards the rigid floating roofs, the application of such roofs to existing tanks is hardly possible on account of the complications involved in assembling and erecting them.

The weight of either of these constructions increases at a considerably greater ratio than the dimensions of the covered liquid surface in the tank, and it is for this reason that their application to oil storage units of considerable size is limited.

The present invention obviates these drawbacks and allows the liquid surface of oil storage units, whether tanks or open storage reservoirs, to be insulated, independently of their size or shape.

According to the invention, the surface of the liquid is covered with separate floating cells, each containing a closed air chamber, which are connected together by means which allow free relative movement of the individual cells.

The connection between adjacent cells is made by alternately forming the lower ends of adjacent vertical walls as trough-shaped channels and as plain walls, the lower ends of which are immersed in the oil contained in the channels.

In the accompanying drawings which represent the insulation devices of a storage tank according to the invention—

Figure 4:
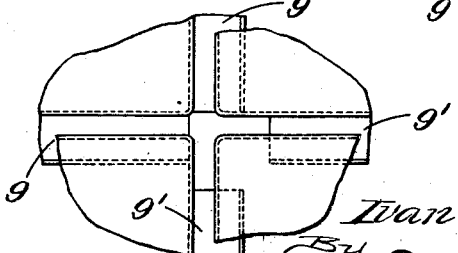

Fig. 4 a plan of the junction of four cells.

Each floating cell A comprises an upper air chamber $b$ and a lower gas or vapour collecting chamber $c$. The cells are of rectangular cross section except where, as at $A'$, they conform to the circular walls 5 of the tank.

The air chambers $b$ are closed at the top by walls 6 and below by walls or floors 7 separating them from the gas collecting chambers $c$, which are open below and are filled to a certain level with the oil.

Figure 1:
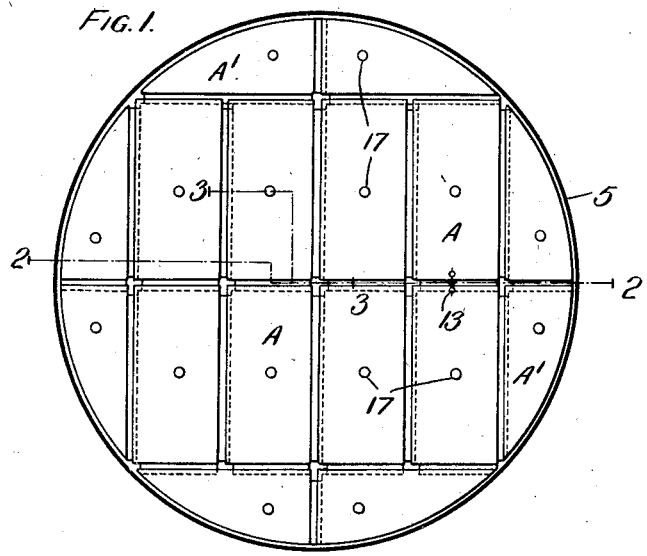
Fig. 1 is a plan with the top cover removed.

The cells are arranged, as shown in Fig. 1, to lie closely against one another, a vertical side, such as 8, of one cell terminating at its lower end in a trough-shaped channel 9 and the lower end of the adjacent vertical side 10 of the adjoining cell extends into said channel and is immersed in the liquid contained in same. Of any two adjacent vertical sides of adjoining cells, one terminates in a channel and the other in a plain wall extending into a channel of an adjacent cell. These channels form with a vertical wall terminating in them a hydraulic seal and also a flexible connection between the individual cells.

In order that the cells can be readily assembled and their relative positions adjusted in two directions at right angles to each other, it is necessary that the channels 9 should not extend along the whole length of the side, that is to say, equivalent parts should be removed from the ends of the side walls of adjacent cells.

Figure 2:
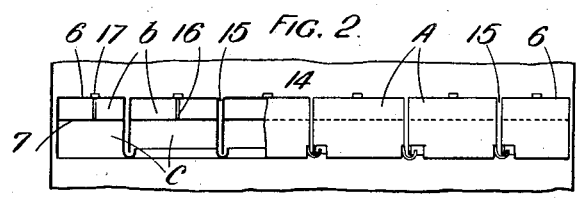
Fig. 2 is a section on the line 2—2 of Fig. 1.
Figure 3:
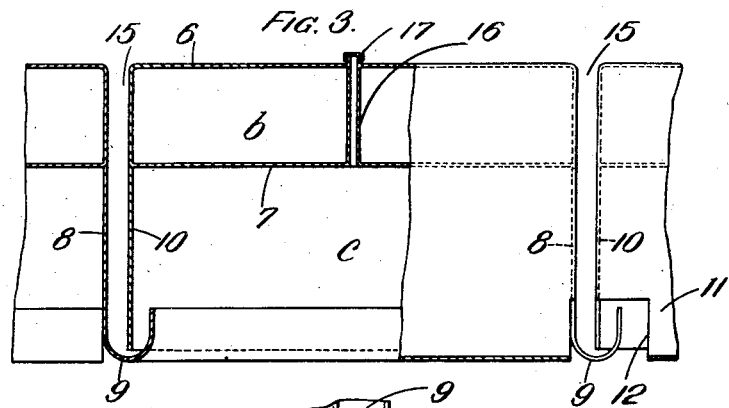
Fig. 3 is an enlarged section on the line 3—3 of Fig. 1.

In Figs. 2 and 3, the side walls 11 are shown with a portion removed at 12, corresponding to the height and width of the upturned portion of the channel 9.

In order that too large an opening should not be left at the junction of four cells, instead of removing portions, such as 12 (Figure 3) from the side walls, the channels 9' are not continued to their full length but terminate short of the ends of the walls as shown in Fig. 4. Of two adjacent channels lying in the same direction one is continuous with the length of the side and the other terminates short of the full length.

In order to prevent the vertical walls of the cells from jumping out of the troughs during any agitation of the surface of the liquid, for instance when the tank is being filled, the top plates 6 of adjacent cells are connected by small chains, as shown at 13 in Fig. 1.

The air chambers $b$ keep the cells $a$ afloat and prevent the liquid from being heated from above.

The lower compartments $c$ of the cells collect any gases or vapours produced by a rise of temperature of the oil or by other causes. As these gases collect in the upper part of the chambers c, the immersion of the cells decreases. When, due to the cooling of the liquid, the vapours are condensed into the liquid state or are absorbed by the liquid, the cells will descend.

The height of the walls of the chambers c depends in each particular instance on the nature of the oil products and the climatic conditions of the locality where the storage tanks are situated.

The troughs or channels also serve to direct the rising gas bubbles from the lower part of the tank into the chambers c and prevent the bubbles from finding their way into the air space 14 above the cells through the spaces 15 between adjacent cells.

In order to remove the air from the chambers c while assembling the insulation on the top of the oil, the upper wall 6 of each air chamber is connected with the lower wall 7 by a tube 16 fitted with a cap or plug 17. When the cells are being lowered into position, the cap 17 is removed, and when the cells are being raised the chambers c are filled with atmospheric air in order to facilitate the lifting.

The cells are inserted into the oil in a manner similar to that in which roof tiles are laid. The vertical sides, such as 10, are inserted into the corresponding channels 9 and the chains 13 are secured.

In order to install the insulation in existing tanks, it is only necessary to provide openings in the roof large enough to enable the cells to be lowered into the tank where they can be assembled on the top of the oil.

The flexible floating insulation can be applied to insulate liquid surfaces of any size or shape without altering the general design, the weight and cost being in direct proportion to the area covered.

Having thus described the nature of the said invention and the best means I know of carrying the same into practical effect, I claim:—

1. Means for preventing the evaporation of fluid contained in a storage tank, comprising a plurality of cells adapted to float side by side upon and to cover the surface of the fluid in the tank, each of said cells having its upper end closed and its lower end open and adapted to depend below the surface of said fluid, the abutting side walls of adjacent cells having their lower ends provided with joint-forming means adapted to close the spaces between the lower ends of said cells.

2. Means for preventing the evaporation of fluid in a storage tank, comprising a plurality of cells adapted to float side by side upon and to cover the surface of the fluid in the tank, said cells having their upper ends closed and having their lower ends open and adapted to project below said surface, each of said cells having the lower ends of some of its side walls straight and the lower ends of others of its side walls provided with outwardly projecting lips to receive the straight lower ends of side walls of adjacent cells.

3. Means for preventing the evaporation of fluid in a storage tank according to claim 6, wherein some of the side walls of some of the cells are cut away at one of their lower corners.

4. Means for preventing the evaporation of fluid in a storage tank, comprising a plurality of floats arranged side by side upon and covering the surface of the fluid in the tank, each of said floats having its side walls depending below its bottom to extend into the fluid in the tank, the lower ends of some of the depending side walls of each of said floats being straight and others of said lower ends extending outwardly and upwardly the outwardly and upwardly extending lower ends of the side walls of each float straddling the straight lower ends of the side walls of adjacent floats.

5. Means according to claim 8 for preventing the evaporation of fluid in a storage tank wherein each of the floats has an upper wall and a lower wall and comprising tubes extending through said upper and lower walls for the escape of gas contained in the spaces between the depending side walls of the floats and means for closing the upper ends of said tubes.

6. Means for preventing the evaporation of fluid from a storage tank of substantially circular horizontal cross-section, comprising a plurality of cells having their upper ends closed and their lower ends open and adapted to project below the surface of the fluid in the tank, those cells which are adjacent the circular side wall of the tank having their walls which abut against the side wall of the tank shaped to conform to the curvature of said side wall and having their other side walls substantially flat, the cells intermediate the first named cells being substantially right angular in horizontal cross-section and each having the lower ends of some of its side walls straight and the lower ends of others of its side walls turned outwardly and upwardly to straddle the straight lower ends of side walls of adjacent cells.

In testimony whereof I have signed my name to this specification.

IVAN RODIONOVITCH AFONIN.